United States Patent Office 3,454,393
Patented July 8, 1969

3,454,393
NORTRICYCLIC-3-UREAS AND THEIR HERBICIDAL COMPOSITIONS AND METHODS OF USE
Gerhard Müller, Leverkusen, and Ludwig Eue and Helmuth Hack, Cologne, Germany, assignors to Farbenfabriken Bayer Aktiengesellschaft, Leverkusen, Germany, a corporation of Germany
No Drawing. Filed May 12, 1966, Ser. No. 549,451
Claims priority, application Germany, May 15, 1965, F 46,062
Int. Cl. A01n 9/20, 5/00; C07c 127/12
U.S. Cl. 71—119     10 Claims

ABSTRACT OF THE DISCLOSURE

Nortricyclic - 3 - ureas (i.e., N - [tricyclo(2,2,1,0$^{2,6}$)heptyl-3] ureas or 3-ureido-tricyclo(2,2,1,0$^{2,6}$)heptanes), some of which are known and all of which possess strong herbicidal properties, and their compositions with dispersible carrier vehicles as well as methods for the production and herbicidal use thereof.

---

The present invention relates to particular nortricyclic-3-ureas (i.e., N-[tricyclo(2,2,1,0$^{2,6}$)heptyl-3] ureas or 3-ureido-tricyclo(2,2,1,0$^{2,6}$)heptanes), some of which are known, all of which surprisingly possess strong herbicidal properties, to their compositions with dispersible carrier vehicles, and to methods for the production and use thereof.

Certain of the nortricyclic-3-ureas contemplated herein, and processes for their production, as well as other uses therefor, have been claimed and/or disclosed in copending U.S. application Ser. No. 524,851, filed Feb. 3, 1966. Specifically, in said copending U.S. application it is disclosed that certain of the instant compounds possess insect-repellent and mite-repellent properties, but there has been no appreciation heretofore that such compounds also possess strong herbicidal properties.

Furthermore, it is known that dicyclically- and tricyclically-substituted ureas can be used as herbicides (cf. German Patent No. 1,081,453 and Pesticide Index 1961, page 175). These herbicides are used, for example, as selective herbicides in bean cultivation.

It is an object of the present invention to provide certain particular new nortricyclic-3-ureas which possess valuable herbicidal properties; to provide active compositions of particular nortricyclic-3-ureas, some of which are known, in the form of mixtures of such compounds with liquid and solid dispersible carrier vehicles; and to provide methods of using such compounds in a new way, especially for combating weeds or undesired plants, or the like.

Other and further objects of the present invention will become apparent from a study of the within specification and accompanying examples.

It has now been found in accordance with the present invention that the particular nortricyclic-3-ureas, or N-[tricyclo(2,2,1,0$^{2,6}$)heptyl - 3], or 3 - ureido - tricyclo (2,2,1,0$^{2,6}$)heptanes, some of which are known, having the general formula:

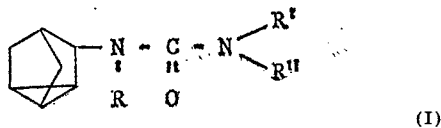

(I)

in which R represents a member selected from the group consisting of hydrogen, alkyl having 1 to 4 carbon atoms, and cycloalkyl having 5 to 6 ring carbon atoms, R' and R" each respectively represents a member selected from the group consisting of hydrogen, aliphatic hydrocarbon having 1 to 6 carbon atoms, cycloalkyl having 5 to 6 ring carbon atoms, and lower alkoxy, with the proviso that R' and R" when taken together with the adjacent N atom form a heterocyclic ring having 5–6 ring members, as well as the corresponding substituted aliphatic hydrocarbon, cycloalkyl, lower alkoxy and N-heterocyclic ring members which are substituted with a substituent selected from the group consisting of halo, nitro, amino, hydroxy, and mixtures of such substituents, at least one of R' and R" being lower alkoxy when R is hydrogen, have strong herbicidal properties.

The compounds of general Formula I which have not been disclosed in said copending U.S. application or elsewhere heretofore, and which are therefore new, are those in which R is alkyl or cycloalkyl, and those in which R is hydrogen or alkyl or cycloalkyl while R' and/or R" is alkoxy.

It is very surprising that the particular active compounds usable according to the present invention have a substantially higher herbicidal power and a better selective herbicidal activity than comparable herbicides known from the prior art. The particular active compounds usable according to the present invention thus constitute a valuable addition to the art.

It will be appreciated that the active compounds usable according to the present invention can be prepared according to numerous known processes. Thus, the instant compounds can be prepared, for example, by reacting, in known manner, (1) nortricyclyl-3-isocyanate with amines, or (2) nortricyclyl-3-carbamic acid esters with amines, or (3) nortricyclyl-amines with isocyanates or carbamic acid chlorides.

The ureas in which R is a hydrogen atom are obtained in an especially advantageous manner, when the nortricyclyl isocyanate of the formula:

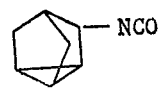

(IIa)

is reacted with an amine of the general formula:

(IIb)

in which R' and R" are the same as defined above.

The nortricyclyl-isocyanate of Formula IIa is obtained from the known corresponding nortricyclyl-carbamic acid ethyl ester (see German Patent No. 1,181,210) by reaction with diphenyl-methane diisocyanate and polyphenylethyl polyisocyanate.

The amines usable in this connection are known. Examples thereof include ammonia, methylamine, dimethylamine, methyl ethylamine, isopropylamine, n-butylamine, isobutylamine, tert.-butylamine, di-n-butylamine, methyl butylamine, cyclohexylamine, cyclopentylamine, piperidine, diethylamine, diallylamine, diethanolamine, di-n-propylamine, diisobutylamine, and the like.

The reaction of the isocyanate with the amine can be carried out in the absence or presence of diluents, such as water, alcohols, esters, ketones and aromatic hydrocarbons.

Furthermore, tertiary amines, such as trimethylamine, can be added in order to accelerate the progress of the reaction.

The reaction temperature can be varied within a fairly wide range. In general, the reaction is carried out at temperatures between about 0 and 150° C.

The reaction is carried out in the usual manner, for example, with equimolar amounts of the starting materials or with the use of an excess of the amine, which is technically more readily obtainable.

Another especially advantageous process for the production of the particular active compounds usable according to the present invention concerns the reaction of a nortricyclylamine of the general formula:

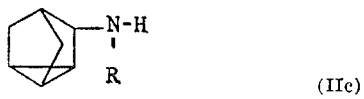
(IIc)

in which R is the same as defined above, with a carbamic acid chloride of the general formula:

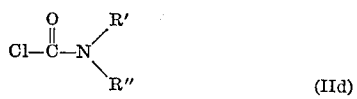
(IId)

in which R' and R'' are the same as defined above.

The nortricyclyl-amine of Formula IIc is obtained in a simple manner by hydrolyzing nortricyclyl-carbamic acid ester with potassium hydroxide (cf. German Patent No. 1,181,210). Nortricyclyl-amines which carry an aliphatic radical on the nitrogen atom are obtained in known manner from nortricyclyl-amine by alkylation with the customary alkylating agents, for example, alkyl halides, alkylsulfuric acid esters and alkyl-p-toluene-sulfonic acid esters, or by the reduction of N-(nortricyclyl-3)-carboxylic acid amides with, for example, lithium aluminum hydride.

The corresponding carbamic acid chlorides usable as starting materials are known.

The reaction is preferably carried out in the presence of an inert organic solvent, such as a hydrocarbon, for example, benzene or toluene, an ester, for example, ethyl acetate, or a ketone, for example, acetone, or the like.

It is expedient to add an acid-binding agent, such as trimethylamine or pyridine, in order to bind the hydrochloric acid formed during the reaction.

The reaction can be carried out within a fairly wide temperature range. The operation is preferably performed at temperatures between about 0 and 100° C.

The reaction is carried out expediently with the use of equivalent amounts of the reaction components.

Advantageously, the particular active compounds usable according to the present invention influence plant growth and can, therefore, be used as versatile and effective weed control agents. As contemplated by the present invention, weeds in the widest sense of the term are to be understood to mean all plants which grow in places where they are undesirable. Whether the particular active compounds usable according to the present invention act as total, or as selective, herbicides essentially depends on the amount employed.

The particular active compounds contemplated by the present invention can be used, for example, for combating herbicidally the following plants: dicotyledons, such as mustard (Sinapis), cress (Lepidium), bedstraw (Galium), chickweed (Stellaria), camomile (Matricaria), galinsoga (Galinsoga), goose-foot (Chenopodium), stinging nettle (Urtica), groundsel (Senecio), cotton (Gossypium), beet (Beta), carrots (Daucus), beans (Phaseolus), potatoes (Solanum), and coffee (Coffea); and monocotyledons, such as timothy (Phleum), meadow grass (Poa), fescue grass (Festuca), Eleusine, foxtail (Setaria), rye grass (Lolium), cheat grass (Bromus), barnyard grass (Echinochloa), corn (Zea), rice (Oryza), oats (Avena), barley (Hordeum), wheat (Triticum), millet (Panicum), and sugar cane (Saccharum); and the like.

Thus, the particular compounds of the instant invention can be used as herbicides either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with inert dispersible liquid diluent carriers and/or inert dispersible solid carriers optionally with the use of carrier vehicle assistants, e.g., surface-active agents, including emulsifying agents and/or dispersing agents, whereby, for example, in the case where water is used as diluents, organic solvents may be added as auxiliary solvents (cf. Agricultural Chemicals, March 1960, pp. 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fraction), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselghur, etc.), and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed, therefore, by themselves, as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.01 and 20%, preferably 0.05 and 10%, by weight of the mixture. Thus, the present invention contemplates over-all compositions which comprise mixtures of a dispersible carrier vehicle such as a dispersible carrier solid, or a dispersible carrier liquid preferably including a carrier vehicle assistant, e.g., a surface-active agent, such as an emulsifying agent and/or a dispersing agent, and an amount of the active compound which is effective for the purpose in question and which is generally between about 0.01 and 95% by weight of the mixture. Specifically, the active compound may be applied to a surface area, such as in pre-emergence use, in concentrations substantially between about 0.5 and 25 kg. per hectare, preferably 1 and 15 kg. per hectare, although it will be appreciated that in connection with the pre-emergence use thereof, the concentration may be varied within a fairly wide range. However, generally the post-emergence range of concentration will be 0.01 and 95% by weight of the mixture as aforesaid, while the pre-emergence range will be between about 0.5 and 25 kg. per hectare, as aforesaid.

Furthermore, the present invention contemplates methods of selectively controlling or combating undesired plants, e.g., weeds and the like, which comprise applying to at least one of (a) such weeds and (b) their habitat, a herbicidally effective amount of the particular active compound of the invention alone or together with a carrier vehicle as noted above. The instant formulations or compositions are applied in the usual manner, for example, by spraying, atomizing, scattering, dusting, watering, sprinkling, and the like, whether for pre-emergence application to the soil or post-emergence application to the weeds.

Significantly, in accordance with the present invention, the particular active compounds contemplated exhibit special advantages. For example, their herbicidal power is higher than that of previously known ureas, and they can be used in the same manner as selective herbicides in bean cultivation, with some of the instant compounds even being particularly useful as selective herbicides in wheat cultivation (see Table 1 herein).

The following examples are given for the purpose of illustrating, without limiting, the utility of the compounds usable according to the present invention:

EXAMPLE 1

Pre-emergence test:                     Parts by weight
    Solvent (acetone) _____ 5
    Emulsifier (benzyloxy polyglycol ether) _____ 1

To produce a suitable preparation of the particular active compound, 1 part by weight of such active compound is mixed with the stated amount of solvent, the stated amount of emulsifier is then added, and the resulting concentrate is diluted with water to the desired final concentration.

Seeds of the test plants are sown in normal soil and, after 24 hours, watered with the preparation of the given active compound. It is expedient to keep constant the amount water per unit urea. The concentration of the particular active compound in the preparation is of no importance, only the amount of active compound per unit area being decisive. After three weeks, the degree of damage to the plants is determined and characterized by the values 0–5 which have the following meaning:

0=No effect
1=Slight damage or delay in growth
2=Marked damage or inhibition of growth
3=Heavy damage and only deficient development, or only 50% emerged
4=Plants partially destroyed after germination or only 25% emerged
5=Plants completely dead or not emerged.

The particular active compounds, the amounts applied and the results obtained can be seen from the following Tables 1 and 2:

TABLE 1.—PRE-EMERGENCE TEST

| Active Compound | | Amount of Active Compound applied, kg./ha. | Echino-chloa | Sinapis | Stella-ria | Chenopo-dium | *Avena fatus* | Wheat | Beans |
|---|---|---|---|---|---|---|---|---|---|
| (A) | ⌬-CH₂-NH-C(O)-N(CH₃)₂ (known) | 10<br>5<br>2.5 | 4-5<br>4<br>3 | 5<br>5<br>3 | 5<br>4<br>3 | 5<br>4-5<br>4 | 4-5<br>3<br>2 | 3-4<br>3-4<br>2-3 | 2<br>0<br>0 |
| (B) | (bicyclic)-NH-C(O)-N(CH₃)₂ (known) | 10<br>5<br>2.5 | 5<br>5<br>3 | 5<br>5<br>4 | 5<br>4-5<br>3 | 5<br>4<br>0 | 1-2<br>1<br>0 | 2-3<br>1<br>0 | 2<br>1<br>0 |
| (IIIa) | ⌬-NH-C(O)-N(CH₃)₂ | 10<br>5<br>2.5 | 5<br>5<br>4 | 5<br>5<br>5 | 5<br>5<br>5 | 5<br>5<br>5 | 4-5<br>4-5<br>4 | 4<br>3-4<br>3 | 2-3<br>0-1<br>0 |
| (IVa) | ⌬-NH-C(O)-N(H)-C₄H₉ | 10<br>5<br>2.5 | 5<br>5<br>3 | 5<br>5<br>5 | 5<br>4<br>4 | 5<br>5<br>5 | 3<br>2<br>1 | 2<br>1<br>0 | 1<br>0<br>0 |
| (Va) | ⌬-NH-C(O)-N(C₂H₅)₂ | 10<br>5<br>2.5 | 5<br>5<br>5 | 5<br>5<br>5 | 5<br>5<br>5 | 5<br>5<br>5 | 4-5<br>4<br>4 | 3<br>2<br>0 | 0<br>0<br>1<br>-2 |

TABLE 2.—PRE-EMERGENCE TEST

| Active Compound | | Amount applied, kg./ha. | Echinochloa | Chenopodium | Sinapis | Wheat | Cotton |
|---|---|---|---|---|---|---|---|
| (B′) | 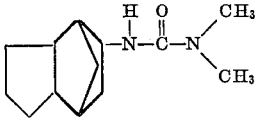 (known) | 10<br>5<br>2.5 | 5<br>5<br>4 | 5<br>3<br>0 | 5<br>5<br>4 | 2-3<br>1<br>0 | 0<br>1<br>2 |
| (VI) | 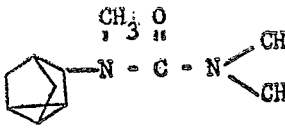 | 10<br>5<br>2.5 | 5<br>5<br>5 | 5<br>5<br>5 | 5<br>5<br>5 | 1<br>0<br>0 | 1<br>0<br>0 |
| (VII) | 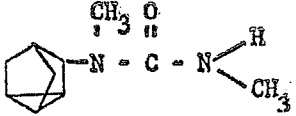 | 10<br>5<br>2.5 | 5<br>5<br>5 | 5<br>5<br>5 | 5<br>5<br>5 | 2<br>1<br>0 | 2<br>0<br>0 |
| (VIII) | 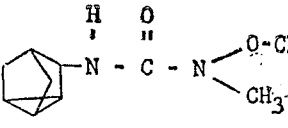 | 10<br>5<br>2.5 | 5<br>5<br>4-5 | 5<br>5<br>4-5 | 5<br>5<br>5 | 2<br>0<br>0 | 1<br>0<br>0 |

The production of some of the particular active compounds of the present invention is described in greater detail in accordance with the following:

EXAMPLE 2

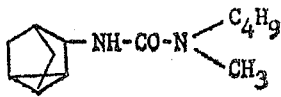

(IXa)

34 g. of nortricyclyl - 3 - isocyanate [i.e., 3-isocyano-tricyclo(2,2,1,0$^{2,6}$)heptane] are added dropwise at room temperature to a solution of 22 g. of methyl-n-butylamine in 150 ml. of anhydrous benzene. The resulting mixture is allowed to react at 50° C. for 3 hours and the solvent is then removed. There remain 51 g. of a viscous reaction product (i.e., N-[tricyclo(2,2,1,0$^{2,6}$)heptyl-3]-N′-methyl-N′-n-butyl-urea) which, according to the infra-red spectrum and elementary analysis, has the structure given above.

*Analysis.*—Calculated: C, 70.3%; H, 9.91%; N, 12.6%. Found: C, 70.13%; H, 9.76%; N, 12.6%.

The isocyanate used as starting material can be prepared as follows:

A mixture of 105 g. of N-nortricyclyl-carbamic acid ethyl ester, 150 g. of diphenyl-methane-4,4′-diisocyanate and 30 g. of a polyphenyl-methyl polyisocyanate, such as is obtained by the condensation of aniline and formaldehyde, followed by phosgenation, is heated at 220° C., with mechanical stirring, under reduced pressure for several hours; a colorless liquid thereby distils off. For purification, the distillate is fractionally distilled. 59 g. of nortricyclyl-3-isocyanate are obtained; B.P. 75–76° C./18 mm. Hg.

EXAMPLE 3

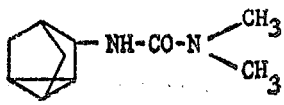

(IIIa′)

20 g. of nortricyclyl-3-isocyanate are reacted, in the manner set forth in Example 2, with an excess of dimethylamine at room temperature. N-(nortricyclyl-3)-N′,N′-dimethyl urea, or N-[tricyclo(2,2,1,0$^{2,6}$)heptyl-3]-N′,N′-dimethyl urea, is obtained in practically quantitative yield; M.P. 136° C.

EXAMPLE 4

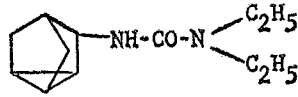

(Va′)

13.5 g. of nortricyclyl-3-isocyanate are added dropwise at room temperature, within the course of about 1 hour, to a solution of 8 g. diethylamine in 50 ml. anhydrous benzene. The reaction mixture is allowed to react for a further 10 hours at 80° C. and the solvent is then removed.

20 g. of N-(nortricyclyl - 3) - N′,N′ - diethyl urea or N-[tricyclo(2,2,1,0$^{2,6}$)heptyl-3]-N′,N′-diethyl urea, are obtained, which melts at 78° C. after recrystallization from white spirit.

The compounds listed in the following table can be produced in an analogous manner:

Table of Compounds

In the corresponding Formula I, R is hydrogen and R′ and R″ are the same as defined above:

| | R′ | R″ | M.P. (° C.) |
|---|---|---|---|
| (Xa) | H | H | 148 |
| (IVa′) | H | C$_4$H$_9$-n | 156 |
| (XIa) | H | C$_4$H$_9$-i | 208 |
| (XIIa) | H | C$_4$H$_9$-tert. | 268 |
| (XIIIa) | C$_3$H$_7$-n | C$_3$H$_7$-n | 103 |
| (XIVa) | C$_4$H$_9$-n | C$_4$H$_9$-n | 68 |
| (XVa) | C$_4$H$_9$-i | C$_4$H$_9$-i | 136 |
| (XVIa) | —CH$_2$—CH=CH$_2$ | —CH$_2$—CH=CH$_2$ | 45 |
| (XVIIa) | —CH$_2$—CH$_2$—OH | —CH$_2$—CH$_2$—OH | Viscous |
| (XVIIIa) | —CH$_2$—CH$_2$—O—CH$_2$—CH$_2$— | | 174 |
| (XIXa) | —CH$_2$—CH$_2$—CH$_2$—CH$_2$—CH$_2$— | | 174 |
| (XXa) | H | —CH$_2$—CH$_2$—OH | Viscous |
| (XXIa) | H | —CH$_2$—CH=CH$_2$ | 133 |
| (VIII′) | O—CH$_3$ | CH$_3$ | 55 |
| (XXII) | O—C$_2$H$_5$ | C$_2$H$_5$ | 41 |

The aforedepicted compounds may be defined as follows:

Xa  N-[tricyclo(2,2,1,0$^{2,6}$)heptyl-3]-urea;
IVa′  N-[tricyclo(2,2,1,0$^{2,6}$)heptyl-3]-N′-n-butyl-urea;
XIa  N-[tricyclo(2,2,1,0$^{2,6}$)heptyl-3]-N′-isobutyl-urea;
XIIa  N-[tricyclo(2,2,1,0$^{2,6}$)heptyl-3]-N′-tert.-butyl-urea;
XIIIa  N-[tricyclo(2,2,1,0$^{2,6}$)heptyl-3]-N′,N′-di-n-propyl-urea;
XIVa  N-[tricyclo(2,2,1,0$^{2,6}$)heptyl-3]-N′,N′-di-n-butyl-urea;
XVa  N-[tricyclo(2,2,1,0$^{2,6}$)heptyl-3]-N′,N′-di-iso-butyl-urea;
XVIa  N-[tricyclo(2,2,1,0$^{2,6}$)heptyl-3]-N′,N′-di-($\alpha$-allyl)-urea;
XVIIa  N-[tricyclo(2,2,1,0$^{2,6}$)heptyl-3]-N′,N′-di-($\beta$-hydroxyethyl)-urea;
XVIIIa  N-[tricyclo(2,2,1,0$^{2,6}$)heptyl-3]-N′,N′-(3′-oxa-pentylene-1′,5′)-urea;
XIXa  N-[tricyclo(2,2,1,0$^{2,6}$)heptyl-3]-N′,N′-(pentyl-ene-1′,5′)-urea;
XXa  N-[tricyclo(2,2,1,0$^{2,6}$)heptyl-3]-N′-$\beta$-hydroxy-ethyl-urea;
XXIa  N-[tricyclo(2,2,1,0$^{2,6}$)heptyl-3]-N′-($\alpha$-allyl)-urea;
VIII′  N-[tricyclo(2,2,1,0$^{2,6}$)heptyl-3]-N′-methyl-N′-methoxy-urea;
XXII  N-[tricyclo(2,2,1,0$^{2,6}$)heptyl-3]-N′-ethyl-N′-ethoxy-urea.

EXAMPLE 5

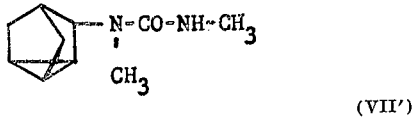

(VII′)

A solution of 4 g. of nortricyclyl-N-methylamine and 3 g. of pyridine in 50 g. of chloroform is saturated at 0° C. with phosgene. The reaction mixture is kept at room temperature for 3 hours and excess phosgene and the solvent are then removed. 20 g. of a 40–50% aqueous methylamine solution are then added. The mixture is allowed to react at room temperature for 2 hours and at 50° C. for 3 hours. The reaction mixture is extracted by shaking with benzene and the benzene solution is dried and concentrated. The initially viscous reaction product is dissolved in hot white spirit; upon cooling, the crystallized urea, i.e. N-[tricyclo(2,2,1,0$^{2,6}$)heptyl-3]-N-methyl-N′-methyl-urea, of melting point 80–85° C., is obtained in a yield of 4.2. g.

Analysis.—Calculated: C, 67.7%; H, 8.9%; N, 15.6%. Found: C, 67.6%; H, 9.0%; N, 15.6%.

EXAMPLE 6

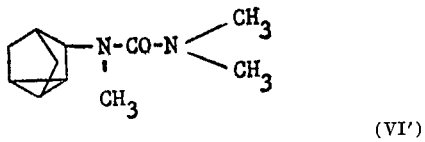

(VI′)

11.0 g. of N,N-dimethyl-carbamic acid chloride are added dropwise at room temperature to a solution of 12.3 g. of nortricyclyl-3-N-methylamine (prepared by the reduction of N-formyl-nortricyclyl-3-amine with lithium aluminum hydride; B.P. 58° C./20 mm. Hg; $n_D^{20}$=1.4850). The mixture is allowed to react at 100° C. for two hours, then stirred with 50 parts by weight of water, and the layers are then separated. The toluene solution is dried and the solvent removed. 10 g., of the liquid urea N-[tricyclo(2,2,1,0$^{2,6}$)heptyl - 3] - N-methyl-N′-N′-dimethyl urea are obtained; $n_D^{20}$=1.5025. The structure of this urea is confirmed by the infra-red spectrum.

Analysis.—Calculated: C, 68.0%; H, 9.3%; N, 14.4%. Found: C, 68.3%; H, 9.3%; N, 13.3%.

In the same way, using the procedure of Example 6, and corresponding molar amounts of:

(a) N-(3-chloro)-n-butoxy-carbamic acid chloride and nortricyclyl-3-N-ethylamine;
(b) N-(3-nitro-1-methyl)n-propoxy-carbamic acid chloride (i.e., N-omega-nitro-sec.-butoxy-carbamic acid chloride) and nortricyclyl-3-N-isopropylamine;
(c) N,N-di(2-amino-1,1-dimethyl)-ethoxy-carbamic acid chloride (i.e., N,N-di-omega-amino-tert.-butoxy-carbamic acid chloride) and nortricyclyl-3-N-tert.-butyl-amine;
(d) N-(3 - bromo-4-hydroxy)-cyclohexyl-carbamic acid chloride and nortricyclyl-3-N-cyclohexylamine;
(e) N-(4-nitro)-piperidino-carbamic acid chloride and nortricyclyl-3-N-cyclopentylamine;
(f) N-ethynyl-carbamic acid chloride and nortricyclyl-3-N-n-propylamine; and
(g) N-(2-hydroxy)-pentyn-4-yl-N-(2 - nitro)-ethoxy carbamic acid chloride and nortricyclyl - 3-n-sec.-butyl-amine, the following respective ureas are formed:

(a′) N-[tricyclo(2,2,1,0$^{2,6}$)heptyl-3-]-N-ethyl-N′-(3-chloro)-n-butoxy-urea;
(b′) N-[tricyclo(2,2,1,0$^{2,6}$)heptyl-3]-N-isopropyl-N′-(3-nitro-1-methyl)-n-propoxy-urea;
(c′) N-[tricyclo(2,2,1,0$^{2,6}$)heptyl-3]-N-tert.-butyl-N′,N′-di-(2-amino-1,1-dimethyl)-ethoxy-urea;
(d′) N-[tricyclo(2,2,1,0$^{2,6}$)heptyl-3]-N-cyclohexyl-N′-(3-bromo-4-hydroxy) cyclohexyl-urea;
(e′) N-[tricyclo(2,2,1,0$^{2,6}$)heptyl-3]-N-cyclopentyl-N′-(4-nitro)-piperidino-urea;
(f′) N-[tricyclo(2,2,1,0$^{2,6}$)heptyl-3]-N-n-propyl-N′-ethynyl-urea; and
(g′) N-[tricyclo(2,2,1,0$^{2,6}$)heptyl-3]N-sec.-butyl-N′-(2-hydroxy)-pentyn-4-yl-N′-(2-nitro)-ethoxy-urea.

Advantageously, in accordance with the present invention, in the foregoing formulae:

R represents hydrogen; or alkyl having 1–4 carbon atoms, such as methyl, ethyl, n-propyl, isopropyl, n-butyl, isobutyl, sec.-butyl, tert.-butyl, and the like; or cyclo-alkyl having 5–6 ring carbon atoms, such as cyclopentyl and cyclo-hexyl, and the like; and R′ and R″ each respectively represents hydrogen; or aliphatic hydrocarbon having 1–6 carbon atoms, such as methyl, ethyl, n-propyl, isopropyl, n-butyl, isobutyl, sec.-butyl, tert.-butyl, and the like, especially alkyl having 1–4 carbon atoms, and vinyl, $\alpha$-, $\beta$- and $\gamma$- -allyl, butenyl, pentenyl, hexenyl, and the like, especially alkenyl having 2–6 carbon atoms, as well as ethynyl, propynyl, butynyl, hexynyl, and the like, especially alkynyl having 2–6 carbon atoms; or cyclo-alkyl having 5–6 ring carbon atoms, such as cyclo-pentyl and cyclo-hexyl; or lower alkoxy, such as methoxy, ethoxy, n-propoxy, isopropoxy, n-butoxy, isobutoxy, sec.-butoxy, tert.-butoxy, and the like, especially alkoxy having 1–4 carbon atoms; wherein R′ and R″ when taken together with the adjacent N-atom form a heterocyclic ring having 5–6 ring members, optionally containing an oxygen linking atom in the ring, such as piperidino, morpholino, and the like; and substituted aliphatic hydrocarbon having 1–6 carbon atoms, cyclo-alkyl having 5–6 ring carbon atoms, and lower alkoxy of the foregoing type, as well as such N-heterocyclic ring having 5–6 ring members, which are substituted with the substituents; halo, such as chloro, bromo, iodo and fluoro, especially chloro and/or bromo; nitro; amino; and/or hydroxy, including as such substituents mono-, di-, and poly-, as well as mixed kinds of di- and polysubstituents of the aforementioned types.

In accordance with a preferred embodiment of the present invention, especially in connection with the certain particular new nortricyclic-3-ureas of the present invention, R preferably has at least one, or at least two, or at least three, or four carbon atoms, both linear or branched, when R' and R" both are other than alkoxy; and also at least one of R' and R" is alkoxy having at least one, or at least two, or at least three, or at least four, or five carbon atoms when R is hydrogen.

In accordance with a preferred subgroup of the present invention, R represents hydrogen or alkyl having 1–4 carbon atoms while R' and R", respectively, each represents hydrogen or alkyl having 1–4 carbon atoms, or alkenyl having 2–6 carbon atoms, or cyclo-alkyl having 5–6 carbon atoms, or alkoxy having 1–4 carbon atoms, with R' and R" when taken together representing piperidino or morpholino, including as substituents for R' and R", especially hydroxy, yet also chloro and/or bromo and/or nitro and/or amino.

All of the foregoing compounds possess the desired strong herbicidal properties, and especially the capability of selectively destroying weeds, such as those which exist in bean cultivation and wheat cultivation, in accordance with the present invention. It will be realized that the instant compounds possess generally total herbicidal action when used in large quantities, although selective herbicidal action is obtained when used in smaller quantities. As used herein, the term "weeds" is meant to include not only weeds in the narrow sense, but also in the broad sense, whereby to cover all plants and vegetation considered undesirable for the particular purposes in question.

The present invention contemplates, in addition to the foregoing, particular new compounds which are indeed effective in combating and controlling undesired weeds, these compounds being distinguished by the presence of N-alkyl and/or N'-alkoxy moieties on the N-nortricyclyl-3-urea molecule.

It will be appreciated that the instant specification and examples are set forth by way of illustration and not limitation, and that various modifications and changes may be made without departing from the spirit and scope of the present invention which is to be limited only by the scope of the appended claims.

What is claimed is:
1. Herbicidal composition which consists essentially of a mixture of an inert dispersible carrier vehicle selected from the group consisting of (1) a dispersible liquid containing a surface-active agent selected from the group consisting of emulsifying agents, dispersing agents, and mixtures of such agents, and (2) a dispersible finely divided solid, and a herbicidally effective amount, substantially between about 0.01–95% by weight of the mixture, of a nortricyclic-3-urea having the formula:

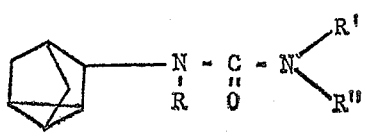

in which R represents a member selected from the group consisting of hydrogen and alkyl having 1 to 4 carbon atoms, R' and R" each respectively represents a member selected from the group consisting of hydrogen, aliphatic hydrocarbon having 1 to 6 carbon atoms, and lower alkoxy, at least one of R' and R" being lower alkoxy when R is hydrogen.

2. Method of combating weeds which comprises applying to at least one of (a) such weeds and (b) their habitat, a herbicidally effective amount of a nortricyclic-3-urea having the formula

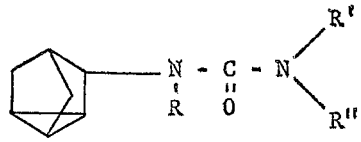

in which R represents a member selected from the group consisting of hydrogen and alkyl having 1 to 4 carbon atoms, R' and R" each respectively represents a member selected from the group consisting of hydrogen, aliphatic hydrocarbon having 1 to 6 carbon atoms, and lower alkoxy.

3. Method according to claim 2 wherein said urea is used in the form of a mixture with an inert dispersible carrier vehicle selected from the group consisting of (1) a dispersible liquid containing a surface-active agent selected from the group consisting of emulsifying agents, dispersing agents, and mixtures of such agents, and (2) a dispersible finely divided solid, with said urea being present in an amount substantially between about 0.01–20% by weight of the mixture.

4. Method according to claim 2 wherein said urea is N-[tricyclo(2,2,1,0$^{2,6}$)heptyl-3] - N - methyl - N',N' - dimethyl urea.

5. Method according to claim 2 wherein said urea is N-[tricyclo(2,2,1,0$^{2,6}$)heptyl-3]-N-methyl - N' - methyl urea.

6. Method according to claim 2 wherein said urea is N - [tricyclo(2,2,1,0$^{2,6}$)heptyl-3]-N'-methyl-N'-methoxy-urea.

7. Method according to claim 2 wherein said urea is N - [tricyclo(2,2,1,0$^{2,6}$)heptyl-3]-N'-ethyl - N' - ethoxy-urea.

8. Method according to claim 2 wherein said urea is N-[tricyclo(2,2,1,0$^{2,6}$)heptyl-3]-N',N'-dimethyl urea.

9. Method according to claim 2 wherein said urea is N-[tricyclo(2,2,1,0$^{2,6}$)heptyl-3]-N'-n-butyl urea.

10. Method according to claim 2 wherein said urea is N-[tricyclo(2,2,1,0$^{2,6}$)heptyl-3]-N',N'-dimethyl urea.

References Cited

UNITED STATES PATENTS

| | | |
|---|---|---|
| 2,782,238 | 2/1957 | Bluestone et al. _____ 260—612 |
| 3,304,167 | 2/1967 | Buntin et al. _____ 71—119 |
| 3,350,194 | 10/1967 | Buntin _____ 71—119 |

FOREIGN PATENTS

| | | |
|---|---|---|
| 998,702 | 7/1965 | Great Britain. |
| 1,071,507 | 6/1967 | Great Britain. |
| 1,467,417 | 12/1966 | France. |
| 1,081,453 | 5/1960 | Germany. |
| 1,181,210 | 11/1964 | Germany. |
| 1,201,337 | 9/1965 | Germany. |

OTHER REFERENCES

Schmerling, Conversion of Bicycloolefins (1958) CA52, p. 14694 (1958).

ELBERT L. ROBERTS, *Primary Examiner.*

G. HOLLRAH, *Assistant Examiner.*

U.S. Cl. X.R.

71—94, 95; 260—247.2, 294, 295, 553, 562; 424—267, 274, 322

PO-1050
(5/69)

UNITED STATES PATENT OFFICE
CERTIFICATE OF CORRECTION

Patent No. 3,454,393   Dated July 8, 1969

Inventor(s) Gerhard Müller and Ludwig Eue and Helmuth Hack

It is certified that error appears in the above-identified patent and that said Letters Patent are hereby corrected as shown below:

Columns 5 and 6, Table 1, the last vertical group of digits under the heading "Beans"

"0
0
1
-2"

should read

-- 2
0-1
0 --

Columns 7 and 8, Table 2, the first vertical group of digits under the heading "Cotton"

"0
1
2"

should read

-- 2
1
0 --

Column 12, line 42, "dimethyl urea" should read --diethyl urea--

SIGNED AND
SEALED
MAY 5 1970

(SEAL)
Attest:

Edward M. Fletcher, Jr.
Attesting Officer

WILLIAM E. SCHUYLER, JR.
Commissioner of Patents